United States Patent [19]
Maloney

[11] Patent Number: 6,166,846
[45] Date of Patent: *Dec. 26, 2000

[54] THROUGH SILICON MODULATOR AND METHOD

[75] Inventor: Timothy J. Maloney, Palo Alto, Calif.

[73] Assignee: Intel Corporaqtion, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/223,419

[22] Filed: Dec. 30, 1998

[51] Int. Cl.[7] .................................................. G02F 1/03
[52] U.S. Cl. ............................ 359/247; 359/248; 359/263
[58] Field of Search ..................................... 359/248, 247, 359/263

[56] References Cited

U.S. PATENT DOCUMENTS

| | | | |
|---|---|---|---|
| 3,714,522 | 1/1973 | Komiya | 317/235 R |
| 5,040,859 | 8/1991 | White | 359/276 |
| 5,157,537 | 10/1992 | Rosenblatt | 359/245 |
| 5,249,074 | 9/1993 | Topham | 359/248 |
| 5,280,189 | 1/1994 | Schuppert et al. | 257/458 |
| 5,428,226 | 6/1995 | Adams | 257/80 |
| 5,488,504 | 1/1996 | Worchesky et al. | 359/248 |

OTHER PUBLICATIONS

Soref, R.A., et al., "Electrooptical Effects in Silicon", *IEEE Journal of Quantum Electronics*, vol. QE–23, No. 1, pp. 123–129, (Jan. 1987).

*Primary Examiner*—Georgia Epps
*Assistant Examiner*—Adrianne Riviere
*Attorney, Agent, or Firm*—Schwegman, Lundberg, Woessner & Kluth, P.A.

[57] ABSTRACT

A through silicon optical modulator alters a phase of a light beam which enters the back of a silicon die. The modulator can be formed as a PMOS transistor fabricated in an n-well, or can be an NMOS transistor having a negative gate to substrate voltage. By modulating the well voltage (or gate potential) the phase of a portion of the reflected light is altered. Two accumulation layers are selectively formed in the light path which is reflected from the transistor gate electrode. The phase change is detected to provide a signal from the integrated circuit having the through silicon optical modulator structure.

27 Claims, 3 Drawing Sheets

THROUGH SILICON MODULATOR AND METHOD

TECHNICAL FIELD

The present invention relates generally to optical modulators and in particular the present invention relates to through silicon optical modulators.

BACKGROUND

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off-chip circuit connections. At slower clock speeds, the capacitive loading on integrated circuit lines is generally not a significant factor. However, as integrated circuit design clock speeds continue to climb towards the gigahertz range and beyond, it is evident that one of the major bottlenecks for future integrated circuits, such as for example, but not limited to, microprocessors, off-chip caches, controllers, etc. will be the input/output bandwidth and/or round trip delay between and within chips.

Prior attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power and induce noise. Further, adding large amounts of on-die decoupling capacitance to suppress noise results in more heat which needs to be dissipated and a requirement for more valuable integrated circuit die area.

Other prior attempts to overcome traditional integrated circuit interconnection limitations included the use of optical interconnections. The prior attempts at optical interconnections between integrated circuits have generally involved or have been based on two typical approaches.

One approach is based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine GaAs with silicon based metal oxide semiconductor (MOS) technology.

The second typical prior art approach is based on using silicon based optical waveguides. These waveguides are generally built using silicon-on-insulator (SOI) based processing techniques. Prior SOI based modulators utilize silicon waveguide structures to switch light passing through the optical waveguide. The switching mechanism utilizes injection of carriers into the waveguide, similar to a bipolar based transistor. One consequence of this is slow speed, for example up to several hundred megahertz, and very high power consumption, for example, 10 mW or more for a single switch. In order to increase the modulation depth, one often tries to obtain a large interaction volume between the injected charge and the light beam. This is generally accomplished by making very long waveguides, for example, on order of thousands of microns, thereby increasing the interaction length through which the light beam travels. As can be appreciated to those skilled in the art, actual incorporation of SOI waveguides into existing multi-layer standard CMOS based processing is not straightforward. Thus, utilization of these waveguide structures becomes quite impractical when used for high speed input/output in large transistor count microprocessors.

For the reasons stated above, and for other reasons stated below which will become apparent to those skilled in the art upon reading and understanding the present specification, there is a need in the art for an apparatus and method for optically modulating light using MOS fabrication technologies.

SUMMARY OF THE INVENTION

In one embodiment, the present invention relates to an integrated circuit optical modulator, providing a signal, comprising an isolation well located in a substrate of the integrated circuit. The modulator includes first reflector areas fabricated as source/drain regions in a metal oxide semiconductor (MOS) field effect transistor (FET), and a second reflector area fabricated as a gate positioned between the source/drain regions. In operation, a light beam enters through the substrate of the integrated circuit and is reflected from the first and second reflector areas such that a diffracted light beam is reflected from the optical modulator representing a state of the signal.

In another embodiment, an integrated circuit optical modulator comprises first reflector areas fabricated as source/drain regions in a field effect transistor (FET), the first reflector areas are fabricated in a substrate, and a second reflector area fabricated as a gate positioned between the source/drain regions. A signal forms accumulation layers in the polysilicon gate and the substrate between the first reflector areas. In operation, a light beam enters through the substrate of the integrated circuit and is reflected from the first and second reflector areas such that a diffracted light beam is reflected from the optical modulator representing a state of the signal.

DETAILED DESCRIPTION OF THE INVENTION

Figure 1:
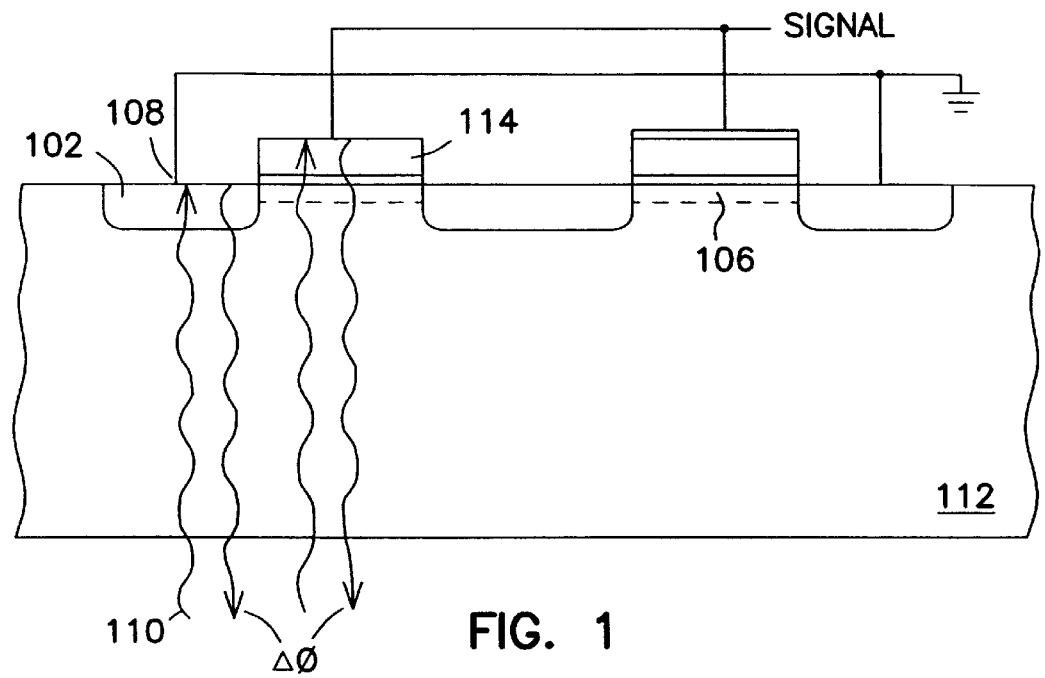
FIG. 1 is a cross-section of an optical modulator using an NMOS FET.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The terms wafer and substrate used in the following description include any structure having an exposed surface with which to form the integrated circuit (IC) structure of the invention. Both wafer and substrate include, but are not limited to, doped and undoped semiconductors, epitaxial semiconductor layers supported by a base semiconductor or insulator, as well as other semiconductor structures well known to one skilled in the art. The term conductor is understood to include conductors and semiconductors, and the term insulator is defined to include any material that is less electrically conductive than the materials referred to as conductors. The following detailed description is, therefore, not to be taken in a limiting sense, and the scope of the present invention is defined only by the appended claims, along with the full scope of equivalents to which such claims are entitled.

Prior to describing the present invention, a description of a related optical modulation using a metal oxide semiconductor (MOS) integrated circuit devices is provided. An additional description of one MOS modulator is provided in U.S. patent application Ser. No. 08/995,277, entitled "METHOD AND APPARATUS FOR OPTICALLY MODULATING LIGHT THROUGH THE BACKSIDE OF AN INTEGRATED CIRCUIT DIE", and filed Dec. 19, 1997.

The related MOS modulator provides a silicon phase diffraction grating including a two-dimensional array of MOS integrated circuit devices. The modulator is designed to have a light beam directed through the back of an integrated circuit. The light is deflected by the integrated circuit. If regions of the circuit through which the light passes are charged, the phase of the deflected light is changed due to a plasma optical effect. In contrast, a phase of the portion of deflected light beam which passes through uncharged regions is not changed. If the charged areas are modulated, a modulated phase change can be provided.

The plasma optical effect arises due to an interaction between the optical electric field (E-field) vector and free charge carriers present along the propagation path of the light beam. The electric field of the light beam polarizes the free charge carriers and effectively perturbs the local dielectric constant of the medium. This in turn leads to a perturbation of the local velocity of an optical wave and hence the refractive index for the light, since the refractive index is simply the ratio of the speed of the light in a vacuum to that in the medium. The free charge carriers also lead to absorption of the optical field as optical energy is used to accelerate the free charge carriers. Generally, the refractive index perturbation is a complex number with the real part being the part which causes the velocity change and the imaginary part being related to the free charge carrier absorption. The amount of phase shift due to free charge carriers due to the plasma optical effect is given by:

$$\Phi = n_o \omega_p^2 \lambda L / (4\pi c^2) \quad (1)$$

where $\Phi$ is the phase shift, $n_o$ is the nominal index of refraction, $\omega_p$ is the plasma optical frequency, $\lambda$ is the wavelength of light, L is the thickness of the free charge carrier region and c is the speed of light.

As a result of the phase shifting due to the plasma optical effect, interference occurs between the phase modulated and non-phase modulated portions of the diffracted light beam causing constructive and destructive interference in the wavefronts that propagate away from an integrated circuit. Accordingly, a zero order diffraction of the diffracted light beam that passes through and propagates away from an integrated circuit is amplitude modulated in response to an integrated circuit signal which modulates the amount of free charge in charged regions. Thus, the integrated circuit signal may be extracted from the integrated circuit through the amplitude modulated zero order diffraction of a diffracted light beam.

FIG. 1 illustrates a light beam passing though source and drain regions 102, as well as a channel region 106 of a MOS transistor. The light beam 110 is deflected off of a deflector 108, which in one embodiment may be either a source/drain or gate contact conductor, and back out of the semiconductor silicon substrate 112. As shown, deflected light passes through both the source/drain regions 102, and a modulating inversion layer of the transistor channel. Formation of the inversion layer is controlled by a potential applied to the transistor gate 114. Again, the light is reflected after passing through the gate.

As discussed above, deflected light is phase shifted due to the free charge carriers in the channel due to the plasma optical effect. Since the amount of free charge in channel 106 is modulated in response to a signal applied to the gate, the phase of deflected light through the inversion layer is also modulated in response to the signal. In contrast, there is no relative phase shift in deflected light through the source/drain regions since there is substantially no free charge in source/drain regions.

The modulation structures can be arranged to form an array of parallel strips of gate polysilicon which cause constructive and destructive interference in the wavefronts that propagate away from the reflective surfaces. This arrangement is referred to herein as a diffraction grating. Since the amount of phase shift in the deflected light beams that pass through channels is modulated in response to a signal, the optical power in the zero order diffraction beam is modulated accordingly. When the grating is turned off (no inversion layer), the total optical power in the deflected beam that comes back out of the silicon is unaltered. When the inversion layer is present, optical power is redistributed due to interference from the zero order to higher orders. One solution to detecting the power modulation is to look at either the zero order diffraction, or look at all, or some, of the higher orders but not the zero order. If one looks at the zero order diffraction, a photo detector receiving the reflected light sees a nominal direct current (DC) power with the grating off and a lightly reduced power when the modulator is turned on. When looking at the null points in the higher orders of diffraction, the photo detector sees zero power with the grating off and a finite power with the grating on. Using known techniques in optical signal recovery, the signal can be extracted from the modulated zero order diffraction, or the higher order diffractions, of the deflected light beams.

It is observed above in equation (1) that the amount of phase shift is dependent upon the thickness L of the charged region due to plasma optical effect. Typical inversion layers found in many of today's advanced MOS technology are quite thin, for example, on the order of approximately 5 nm. One can observe that the path length L through which the optical beam passes is thus very small. This may result, depending on the free charge carrier density, in a very small phase shift. Correspondingly, this will result in a very small amplitude modulation.

The following description provides an apparatus and method for increasing the efficiency of a Through Silicon Optical Modulator (TSOM). In one embodiment the device increases a free-carrier-induced phase shift of a light beam by arranging for an accumulation layer on both sides of a MOS gate. In one embodiment, the modulator is fabricated with an n-well, p-epi (epitaxial) MOS process with polysilicon gate doped by source-drain implant. Other conductive can be used to form the gate structures, and is not limited to polysilicon.

Figure 2:
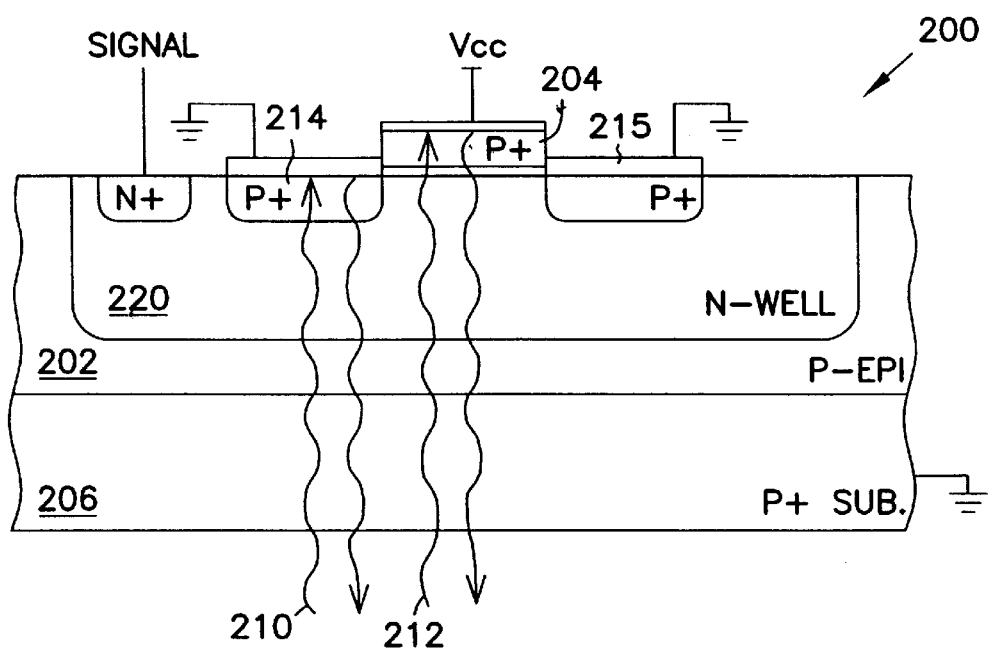
FIG. 2 is a cross-section of an optical modulator using a PMOS FET.
Figure 3:
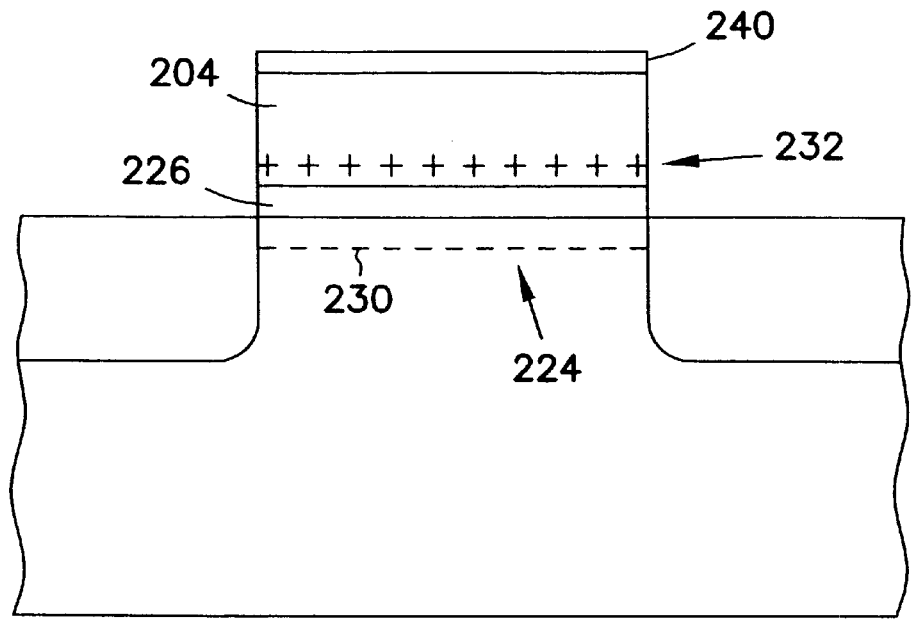
FIG. 3 is a cross-section of a magnified view of regions of the optical modulator of FIG. 2.

Referring to FIGS. 2 and 3, a TSOM 200 is illustrated which is fabricated as p-type complementary metal oxide semiconductor field effect transistor (PMOS FET) using a p-epi 202, n-well MOS process with silicided junctions and a polysilicon (poly) gate 204. During operation, the TSOM is illuminated, as described above, from the back side of the silicon integrated circuit substrate 206. Two optical paths are available for applied light. In the first optical path 210, light passes through the single crystal silicon and is reflected from a conductive layer located on top of the source/drain regions 214. The reflective layer can be formed as a metal contact, or can be a layer of silicide. When using a layer of silicide, an electrical contact can be located in an area which is not in the light path. The second optical path of light 212 thus passes through the single crystal silicon 206 and polysilicon gate 204 before being reflected from a layer of silicide located on top of the polysilicon gate. This reflected light then passes through same optical path. The reflected light is collected, for example using a photo diode (not shown). The reflected light is analyzed, as described above, to extract the electrical modulating signal. In contrast to the modulator of FIG. 1, the present modulator has the modulating signal applied to an n-well 220. This allows the modulator to operate using voltages which are within customary MOS power supply ranges. It is noted that a large gate electrode structure can be used as a primary reflective surface, and that the second reflective surface (above the source/drain areas) is not necessary.

The modulator of FIG. 1 is based on an NMOS inversion layer and may not produce substantial cumulative optical phase shifts. That is, the modulator includes depletion layers in the optical path (channel 106) which produce offsetting phase shifts in the opposite direction. In contrast, the n-well modulator embodiment 200 has excess free carrier (e.g., accumulation) layers in both the channel 224 and polysilicon gate 204 regions, see FIG. 3. This structure is compatible with fabrication methods in which the polysilicon gate is doped during a source-drain 214 implant operation. The gate is separated from the channel by a gate oxide layer 226.

In operation, an electrical signal is impressed on the light beam by taking the n-well potential high or low, to denote the two logical states 1 and 0. Thus, a substantial optical phase shift difference results in response to the n-well modulation. With the n-well at a low potential (e.g., ground), an accumulation layer 230 forms in the n-well (electrons). Because the gate polysilicon is p-doped during source/drain fabrication, an accumulation layer 232 is also formed in the polysilicon gate (holes), see FIG. 3. This causes four noteworthy free-carrier-induced optical phase shifts at the accumulation layers as the beam enters from the back side and is reflected from the silicide 240 on the polysilicon gate 204. Silicide 215, such as $TiSi_2$, can also be located on the source/drain regions 214 in place of metal contacts.

With the n-well at a high potential (opposite logical state), the accumulation layers go away. Further, p+ source-drain areas 214, p-epi 202 and substrate 206, and the built-in voltage of the gate actually deplete free carriers. This provides an optical phase shift in the opposite direction from the accumulation state. Such an arrangement maximizes the amount of free carrier-induced phase shift (and absorption) during one logical state, by introducing accumulation layers, and minimizes the same kind of phase shift during the other logical state, by introducing depletion layers in place of the accumulation layers.

The above PMOS accumulation FET are operated by toggling an n-well potential. Alternatively, the gate of the FET can be toggled with the well and source/drain potentials coupled to ground. For example, the n-well and p-junctions are coupled to ground, and a positive voltage, 0 to Vcc, is toggled to the gate. This embodiment creates accumulation layers in one data state and a neutral condition (not depletion) in the other data state. In another embodiment, both the gate and n-well potentials can be toggled to complementary states. As such, different operating states of the various embodiments of the present invention can be utilized to accomplish optical modulation. These operating states can be used for both NFET and PFET embodiments.

Figure 4:
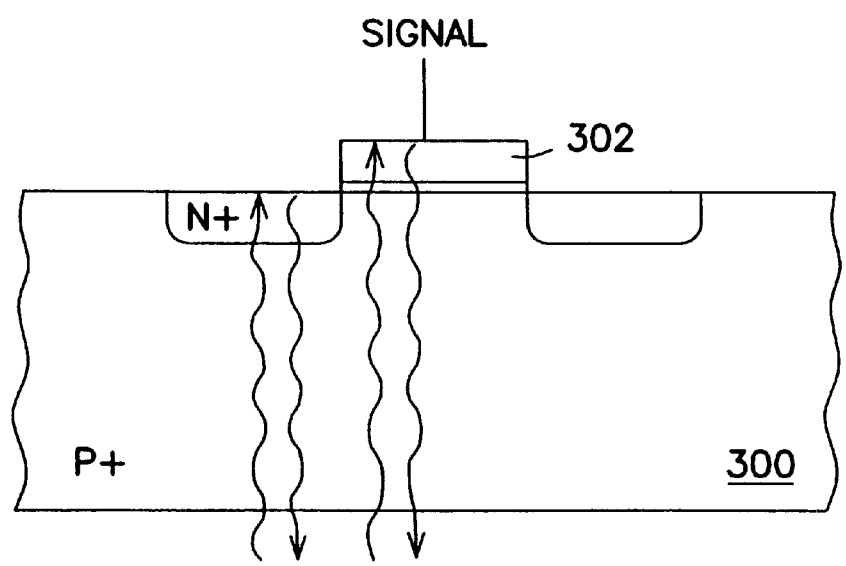
FIG. 4 is a cross-section of an NMOS optical modulator with accumulation layers.

Alternate embodiments of the above modulator can also be fabricated with NMOS FETs. That is, a NMOS FET (NFET) formed in a P-doped substrate 300 can be used in one embodiment, see FIG. 4. The gate polysilicon 302 must, however, be at a potential below the substrate potential to form the accumulation layers. As such, a negative voltage must then be applied to the polysilicon gate to achieve the same effect as the embodiment using the n-well. While this is not completely prohibitive, a charge pump circuit may be needed to implement the required gate voltages and may not be as convenient as the n-well modulator embodiment described above. Nonetheless, the well or gate modulation embodiments may provide benefits if the lateral resistance of the n-well results in a high frequency limit for the TSOM and photocarriers do not help enough in quick formation of the accumulation layer. Further, because the TSOM may be implemented as a repeated MOSFET array in a grating structure, an n-well tap may not be convenient to distribute in the array while preserving efficiency and periodicity.

Detecting the phase shift difference between the logical 1 and 0 electrical states has numerous solutions, known to those skilled in the art, and are not described herein. But it is useful to remember that these free carrier optical phase shifts can in principle be detected with an interferometer, external to the chip.

Figure 5:
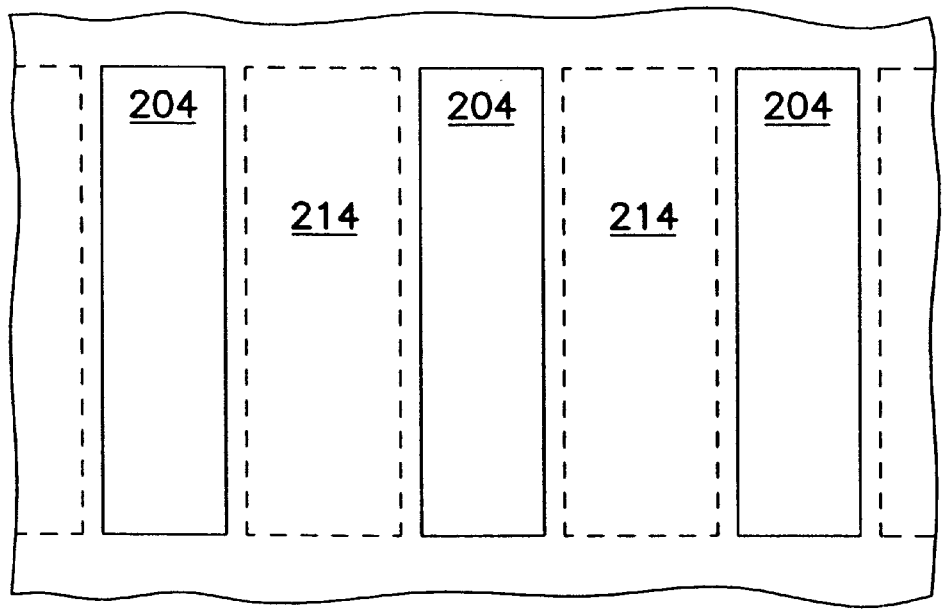
FIG. 5 illustrates a top view of one embodiment of a modulator array.

FIG. 5 illustrates a top view of one embodiment of an array formed using the accumulation modulators described above. The array is formed from a series of FET devices having long parallel gate electrodes 204. The cumulative area of the gates 204 and source/drain regions 214 are maintained to be approximately equal.

Figure 6:
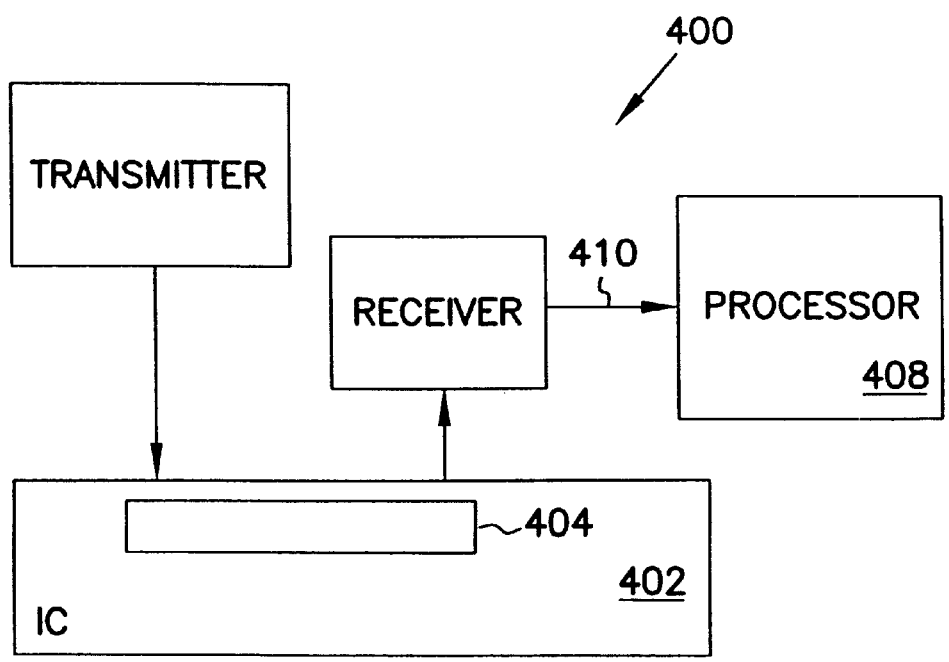
FIG. 6 is a communication system including an optical modulator.

FIG. 6 illustrates a communication system 400 using the optical modulators as described above. The system includes an integrated circuit 402 which has an optical modulator 404. The modulator communicates using a transmitter and a receiver. In one embodiment, the transmitter is located remotely from the modulator and coupled thereto by an optical communication line, such as fiber optics. A common transmitter, or light source, can provide incident light to numerous modulator devices using light beam splitters. One type of transmitter is a GaAs or similar solid-state laser light source. The receiver can also be physically located remotely from the modulator, and/or transmitter. An example of a receiver is a photodiode on an integrated circuit, accompanied by circuitry to interpret and process incoming light signals. It will be appreciated that the transmitter and receiver do not need to be located in a common device. In operation, the optical transmitter transmits a light beam, for example a laser light beam, which enters the integrated circuit and passes through the die. The light is either modulated in response to an applied signal, or is not modulated. The reflected light is received by the optical receiver, which determines a state of the signal based upon a phase shift of the reflected light, as explained above. The signal can then be transmitted to an additional device 408 via bus 410 which processes the signals. It will be appreciated that the optical transmitter and/or receiver can be remotely located from the integrated circuit and optically coupled using known optic connections, such as fiber optic lines. Further, the optical transmitter and/or receiver can be integrated into the processing device. The integrated circuit and processing device can be, but are not limited to, processors, memories, communication switches, application specific integrated circuit devices (ASIC), chip sets. For example, the integrated circuit can be a microprocessor which is coupled to a memory device or other processor.

A through silicon optical modulator has been described which alters the phase of a light beam which enters the back of a silicon die. The modulator can be formed as a PMOS transistor fabricated in an n-well, or can be an NMOS transistor having a negative gate-to-substrate voltage. In either embodiment, two accumulation layers are selectively formed in the light path which is reflected from the transistor gate electrode. By modulating the well voltage (or gate potential in the NMOS) the phase of a portion of the reflected light is altered. This phase change is detected to provide a signal from the integrated circuit having the through silicon optical modulator structure.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An integrated circuit optical modulator providing a signal comprising:
    an isolation well located in a substrate of the integrated circuit;
    first reflector areas fabricated over source/drain regions in a field effect transistor (FET) fabricated in the isolation well;
    a second reflector area fabricated over a gate positioned between the source/drain regions; and
    wherein a light beam enters through the substrate of the integrated circuit and is reflected from the first and second reflector areas such that a diffracted light beam is reflected from the optical modulator representing a state of the signal.

2. The integrated circuit optical modulator of claim 1 wherein the isolation well is an n-doped isolation well, and the source/drain regions are p-doped regions.

3. The integrated circuit optical modulator of claim 2 wherein the gate is p-doped.

4. The integrated circuit optical modulator of claim 1 wherein the modulator is fabricated as an array of FET devices fabricated in the isolation well.

5. The integrated circuit optical modulator of claim 1 wherein the source/drain regions are coupled to a ground potential, and the gate is coupled to a positive supply potential (Vcc).

6. The integrated circuit optical modulator of claim 1 wherein the light beam is an infrared light beam.

7. The integrated circuit optical modulator of claim 1 wherein a first state of the signal produces a first accumulation layer in the isolation well beneath the gate, and a second accumulation layer in the gate, such that light reflected from the second reflector region has passed through four free-carrier-induced optical phase shifts.

8. The integrated circuit optical modulator of claim 1 wherein the first reflector areas further comprise a metal layer located on top of the source/drain regions such that light passing through the source/drain regions is reflected from the metal layer.

9. The integrated circuit optical modulator of claim 1 wherein the second reflector area further comprises a layer of silicide located on top of the gate such that light is reflected from the layer of silicide after passing through the gate.

10. A metal oxide semiconductor (MOS) optical output circuit comprising:
    a p-doped integrated circuit semiconductor substrate;
    a n-doped isolation well located in the p-doped substrate;
    first and second p-doped source/drain regions formed in the isolation well to form field effect transistor (FET) source and drain regions;
    a polysilicon gate structure fabricated on top of the isolation well and located between the first and second p-doped source/drain regions to form a gate of the field effect transistor; and
    a layer of silicide located on top of the first and second p-doped source/drain regions and the polysilicon gate structure, such that a light beam can enter through the substrate and be reflected by the layer of silicide, wherein light reflected from the silicide layer over the polysilicon gate passes through four free-carrier-induced phase shifts when the signal is in a first state.

11. A optical communications system comprising:
    an integrated circuit optical modulator located in an integrated circuit, the optical modulator provides signals and comprises,
    an isolation well located in a substrate of the integrated circuit,
    first reflector areas fabricated over source/drain regions in a field effect transistor (FET) fabricated in the isolation well,
    a second reflector area fabricated as a polysilicon gate position between the source/drain regions, wherein a light beam enters through the substrate of the integrated circuit and is reflected from the first and second reflector areas such that a diffracted light beam is reflected from the optical modulator representing a state of the signals;
    an optical transmitter to provide the light beam;
    a receiver to receive the light beam reflected from the optical modulator; and
    a processor coupled to the optical receiver for processing the signals.

12. The optical communications system of claim 11 wherein the substrate of the integrated circuit is a p-doped substrate, the isolation well is n-doped, the source/drain regions are p-doped, and the polysilicon gate is p-doped.

13. The optical communications system of claim 12 wherein light reflected from the second reflector area passes through at least four free-carrier-induced phase shifts when signals received by the isolation well are in a first state.

14. A method of providing optically modulated signals from an integrated circuit, the method comprising:
    transmitting light into a back side of the integrated circuit and through a substrate of the integrated circuit;
    reflecting the transmitted light from a first reflecting area to provide first reflected light; and
    reflecting the transmitted light from a second reflecting area to provide second reflected light, wherein the second reflected light passes through four free-carrier-induced phase shifts in response to a first state of the signals.

15. The method of claim 14 wherein the first reflecting area is formed over a source/drain region fabricated an isolation well, the isolation well is fabricated in the substrate of the integrated circuit.

16. The method of claim 14 wherein the second reflecting area is formed over a gate structure fabricated on an isolation well, the isolation well is fabricated and the substrate of the integrated circuit.

17. The method of claim 14 wherein a first state of the signals produces two accumulation layers to provide the four free-carrier-induced phase shifts, and a second state of the signals produces two depletion layers to provide opposite phase shifts in the reflected light.

18. An integrated circuit optical modulator comprising:
    first reflector areas fabricated over source/drain regions in a field effect transistor (FET), the first reflector areas are fabricated in a substrate;
    a second reflector area fabricated over a gate positioned between the source/drain regions, the polysilicon gate is coupled to receive a signal which forms accumulation layers in the polysilicon gate and the substrate between the first reflector areas; and
    wherein a light beam enters through the substrate of the integrated circuit and is reflected from the first and second reflector areas such that a diffracted light beam is reflected from the optical modulator representing a state of the signal.

19. The integrated circuit optical modulator of claim 18 wherein the source/drain regions are n-type source/drain regions formed in a p-type substrate.

20. The integrated circuit optical modulator of claim 18 wherein a voltage of the signal is negative with respect to a substrate potential to form the accumulation areas.

21. The integrated circuit optical modulator of claim 18 wherein the modulator is fabricated as an array of FET devices having a plurality of substantially parallel gates.

22. An integrated circuit optical modulator comprising:
    an isolation well located in a substrate of the integrated circuit;
    a reflector area fabricated over a gate positioned above the isolation well; and
    wherein a light beam enters through the substrate of the integrated circuit and is reflected from the reflector area such that a diffracted light beam is reflected from the optical modulator representing a state of a signal.

23. The integrated circuit optical modulator of claim 22 wherein a first state of the signal produces a first accumulation layer in the isolation well beneath the gate, and a second accumulation layer in the gate, such that light reflected from the second reflector region has passed through four free-carrier-induced optical phase shifts.

24. A optical communications system comprising:
    an integrated circuit optical modulator located in an integrated circuit, the optical modulator provides signals and comprises,
    an isolation well located in a substrate of the integrated circuit,
    a reflector area fabricated as a polysilicon gate position between source/drain regions formed in the isolation well, wherein a light beam enters through the substrate of the integrated circuit and is reflected from the reflector area such that a diffracted light beam is reflected from the optical modulator representing a state of the signals;
    an optical transmitter to provide the light beam;
    a receiver to receive the light beam reflected from the optical modulator; and
    a processor coupled to the optical receiver for processing the signals.

25. The optical communications system of claim 24 wherein light reflected from the reflector area passes through at least four free-carrier-induced phase shifts when signals received by the isolation well are in a first state.

26. A method of providing optically modulated signals from an integrated circuit, the method comprising:
    transmitting light into a back side of the integrated circuit and through a substrate of the integrated circuit; and
    reflecting the transmitted light from a reflecting area to provide a reflected light, wherein the reflected light passes through four free-carrier-induced phase shifts in response to a first state of the signals.

27. The method of claim 26 wherein a first state of the signals produces two accumulation layers to provide the four free-carrier-induced phase shifts, and a second state of the signals produces two depletion layers to provide opposite phase shifts in the reflected light.

* * * * *